3,306,727
WEED CONTROL METHOD AND COMPOSITIONS THEREFOR
Ralph P. Neighbors, Olathe, Kans., assignor to Gulf Oil Corporation, Pittsburgh, Pa., a corporation of Pennsylvania
No Drawing. Original application Nov. 13, 1964, Ser. No. 411,147. Divided and this application Nov. 19, 1965, Ser. No. 515,801
6 Claims. (Cl. 71—2.6)

This application is a division of application Serial No. 411,147, filed Nov. 13, 1964 which in turn is a continuation-in-part of U.S. patent application Serial No. 180,306, filed March 16, 1962, now abandoned.

This invention relates to novel compositions and methods for controlling plant growth, and more particularly, this invention relates to compositions and methods for inhibiting plant growth employing as the active plant growth regulator, a substituted cyclopropanecarboxamide.

There are provided by this invention novel herbicidal compositions and methods for controlling plant growth by applying to the locus of the plant a cyclopropanecarboxamide. The novel herbicides of this invention are selected from the cyclopropanecarboxamides and the cyclopropanethiocarboxamides which are represented by the formula:

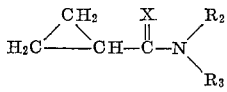

wherein X represents oxygen or sulfur, and $R_2$ and $R_3$ may be hydrogen, hydroxy, alkyl, cycloalkyl, alkenyl, alkynyl, substituted aryl, aralkyl, heterocycic, or substituents which, when taken together with the nitrogen atom to which $R_2$ and $R_3$ are attached, form a heterocyclic ring. More specifically, the herbicidal cyclopropanecarboxamides of this invention are preferably those in which $R_2$ is hydrogen or hydroxy and $R_3$ is a monocyclic substituent selected from the group consisting of 4-chloro-2-butynyl, 3-chlorophenyl, 3-fluorophenyl, 4-bromophenyl, 3,4-dichlorophenyl, 3-bromophenyl, 2,5-difluorophenyl, 4-cyanophenyl, 3-chloro-4-methylphenyl, 3-methoxyphenyl, and 2-thiazolyl.

The cyclopropanecarboxamides of this invention are readily prepared by reaction of cyclopropanecarboxylic acid halide, such as the acid chloride, with the appropriate amine. Preferably, the reaction is run in the presence of an inert organic solvent such as cyclohexane, toluene, dioxane, benzene, n-hexane or n-pentane. Since hydrogen halide is a by-product of the reaction, it is desirable to use a molar excess of the amine or, preferably, a tertiary amine such as triethylamine or pyridine, to react with the hydrogen halide as it is evolved, thereby improving yields and purity of the desired product. The reaction takes place in a relatively short time, about 0.5 to 2 hours usually being sufficient at about room temperature or slightly below room temperature. A preferred reaction temperature is around 15 to 25° C., which is low enough to maintain good control of the reaction. In order to make full use of the reactants, it is preferred to add the cyclopropanecarboxylic acid halide to a solution of the amine and pyridine in an organic solvent, thus maintaining an excess of amine during the reaction period. When an organic solvent for the carboxamide is used, the by-product pyridine hydrohalide can be removed by filtration and the desired carboxamide isolated from the solvent by known procedures. The crude amide can be recrystallized, such as from water-alcohol mixtures, n-hexane or ethyl acetate, in the case of solids, and in the case of liquids can be distilled under reduced pressure.

The cyclopropanethiocarboxamides can be prepared by sulfurization of the corresponding cyclopropanecarboxamide with phosphorus pentasulfide at an elevated temperature, such as about 90–110° C.

The following examples illustrate the general method of preparation of cyclopropanecarboxamides and specifically, the synthesis of a number of cyclopropanecarboxamides and subsequent testing as herbicides. The examples illustrate a wide variety of chemical structure and both activity and selectivity as herbicides. The comparative data presented below demonstrate differences between specific compounds on which preferences may be based. Although, in general, highly active compounds are preferred, certain of the less active compounds have unique selectivity which makes them particularly useful, especially in formulations containing two or more herbicides. The chemical nomenclature employed conforms to the modified form of I.U.C. System as used by the Chemical Abstracts, except for those few instances in which use of the arbitrary system of nomenclature would be definitely inconvenient.

SYNTHESIS OF CYCLOPROPANECARBOXAMIDES

*Example 1.—3′,4′-dichlorocyclopropanecarboxanilide*

A solution of 16.2 grams (0.1 mole) of 3,4-dichloroaniline and 7.92 grams (0.1 mole) of pyridine in 150 ml. of benzene was stirred in a flask and cooled to 15° C. A solution of 10.4 grams (0.1 mole) of cyclopropanecarboxylic acid chloride in 25 ml. of benzene was added dropwise to the stirred amine solution at about 15–25° C. The mixture was then stirred for 2 hours at room temperature and filtered to remove pyridine hydrochloride. The benzene filtrate was diluted with about 500 ml. of n-hexane, chilled to about 0° C. and stirred until the heavy oil layer crystallized. The crude crystals were removed by filtration, washed with water and dried to give 21.5 grams of crude product (93.7% yield) melting at 125–128° C. Recrystallization from an ethanol-water mixture gave 17.6 grams of pure N-(3,4-dichlorophenyl) cyclopropanecarboxamide, M.P. 129.5–130° C.

The following examples describe the preparation of additional cyclopropanecarboxamides according to the general procedure of Example 1.

*Example 2.—N,N′-p-phenylenebiscyclopropane-
carboxamide* p-Phenylenediamine was reacted with 2 moles of cyclopropanecarboxylic acid chloride to give N,N′-p-phenylenebiscyclopropanecarboxamide, which melts at 298–300° C. after recrystallization from acetic acid.

*Example 3.—N-methylcyclopropanecarboxanilide*

The reaction of cyclopropanecarboxylic acid chloride with N-methylaniline gave N-methylcyclopropanecarboxanilide which melts at 69–70° C. after recrystallization from n-hexane.

*Example 4.—2′-chlorocyclopropanecarboxanilide*

2′-chlorocyclopropanecarboxanilide was prepared by the reaction of cyclopropanecarboxylic acid chloride with 2-chloroaniline. The purified product melts at 110–111° C. after recrystallization from an ethanol-water mixture.

*Example 5.—3′-chlorocyclopropanecarboxanilide*

3′-chlorocyclopropanecarboxanilide was prepared by the reaction of cyclopropanecarboxylic acid chloride with 3-chloroaniline. The purified product melts at 147–148.5° C. after recrystallization from a benzene-hexane mixture.

*Example 6.—N-n-butylcyclopropanecarboxamide*

N-n-butylcyclopropanecarboxamide was prepared by the reaction of cyclopropanecarboxylic acid chloride with n-butylamine. Recrystallization from hexane gave the purified product melting at 32–35° C.

Example 7.—4'-chlorocyclopropanecarboxanilide

4'-chlorocyclopropanecarboxanilide was prepared by the reaction of cyclopropanecarboxylic acid chloride with 4-chloroaniline. Recrystallization from an ethanol-water mixture gave a purified product melting at 163–165° C.

Example 8.—N-(2,3,6-trichlorobenzyl)cyclopropanecarboxamide

N - (2,3,6 - trichlorobenzyl)cyclopropanecarboxamide was prepared by the reaction of cyclopropanecarboxylic acid with 2,3,6 - trichloro - benzylamine. The product melted at 161–164° C. after recrystallization from an ethanol-water mixture.

Example 9.—2',5'-dichlorocyclopropanecarboxanilide

2',5' - dichlorocyclopropanecarboxanilide was prepared by the reaction of cyclopropanecarboxylic acid chloride with 2,5-dichloroaniline. The product melts at 163–164° C. after recrystallization from an ethanol-water mixture.

2',4' - dichlorocyclopropanecarboxanilide, M.P. 155–156° C. and 2',3' - dichlorocyclopropanecarboxanilide, M.P. 137–138° C., were prepared in a similar manner.

Example 10.—N-1-naphthylcyclopropanecarboxamide

N-1-naphthlcyclopropanecarboxamide was prepared by the reaction of cyclopropanecarboxylic acid chloride with 1-naphthylamine. The product melts at 175° C. after recrystallization from a benzene-hexane mixture.

Example 11.—4'-bromocyclopropanecarboxanilide

4'-bromocyclopropanecarboxanilide was prepared by the reaction of cyclopropanecarboxylic acid chloride with 4-bromoaniline. The purified product melts at 192–194° C.

3' - bromocyclopropanecarboxanilide, M.P. 142–144° C., and 3'-fluorocyclopropanecarboxanilide, M.P. 123–124° C., were prepared in a similar manner.

Example 12.—N-cyclohexylcyclopropanecarboxamide

N - cyclohexylcyclopropanecarboxamide was prepared by the reaction of cyclopropanecarboxylic acid chloride with cyclohexylamine to give the product which upon purification melts at 138–140° C.

N - cyclopropylcyclopropanecarboxamide, M.P. 110–111° C. was prepared in a similar manner.

Example 13.—4'-cyanocyclopropanecarboxanilide

N - cyclohexylcyclopropanecarboxamide was prepared cyanocyclopropanecarboxanilide) was prepared by the reaction of cyclopropanecarboxylic acid chloride with 4-cyanoaniline. The product melts at 140–141° C. after recrystallization from an ethanol-water mixture.

Example 14.—4'-nitrocyclopropanecarboxanilide

4'-nitrocyclopropanecarboxanilide was prepared by the reaction of cyclopropanecarboxylic acid chloride with 4-nitroaniline. The purified product melts at 180–182° C. after recrystalization from an ethanol-water mixture.

Example 15.—N-(2-thiazolyl)cyclopropanecarboxamide

N-(2-thiazolyl)cyclopropanecarboxamide was prepared by the reaction of cyclopropanecarboxylic acid chloride with 2-aminothiazole. The purified product melts at 164–166° C. after recrystallization from an ethanol-water mixture.

Example 16.—3'-methoxycyclopropanecarboxanilide

N-(3-methoxyphenyl)cyclopropanecarboxamide (or 3'-methoxycyclopropanecarboxanilide) was prepared by the reaction of cyclopropanecarboxylic acid chloride with 3-methoxyaniline. The product melts at 105–106° C. after recrystallization from an ethanol-water mixture.

Example 17.—N,N-di-n-butylcyclopropanecarboxamide

N,N-di-n-butylcyclopropanecarboxamide was prepared by the reaction of cyclopropanecarboxylic acid chloride with di-n-butyl amine. The product was distilled under reduced pressure and collected at 104–107° C./5 mm. Hg.

Example 18.—N-methylcyclopropanecarboxamide

N-methylcyclopropanecarboxamide was prepared by the reaction of cyclopropanecarboxylic acid chloride with methylamine. The product melted at 55–57° C. after recrystallization from diethyl ether.

Example 19.—N-(4-chloro-2-butynyl)cyclopropanecarboxamide

N - (4-chloro-2-butynyl)cyclopropanecarboxamide was prepared by the reaction of cyclopropanecarboxylic acid chloride with 4-chloro - 2 - butynyl-amine. The product melts at 78.5–80° C. after recrystallization from an ethyl acetate-hexane mixture.

Example 20.—3'-chloro-4'-methylcyclopropanecarboxanilide

3'-chloro-4'-methylcyclopropanecarboxanilide was prepared by the reaction of cyclopropanecarboxylic acid chloride with 3-chloro-4-methylaniline. The product melts at 141–142° C. after recrystallization from an ethanol-water mixture.

Example 21.—N,N-(3-oxapentamethylene)cyclopropanecarboxamide

N,N - (3-oxapentamethylene)cyclopropanecarboxamide was prepared by the reaction of cyclopropanecarboxylic acid chloride with morpholine. The product melts at 42–43° C. after recrystallization from n-hexane.

Example 22.—N-(2-pyrimidyl)cyclopropanecarboxamide

N - (2 - pyrimidyl)cyclopropanecarboxamide was prepared by the reaction of cyclopropanecarboxylic acid chloride with 2-amino-pyrimidine. The product melts at 130–131° C. after recrystallization from n-hexane.

Example 23.—3'-trifluoromethylcyclopropanecarboxanilide

3' - trifluoromethylcyclopropanecarboxanilide was prepared by the reaction of cyclopropanecarboxylic acid chloride with 3-trifluoromethylaniline. The product melts at 121–123° C. after recrystallization from a benzene-hexane mixture.

Example 24.—N-(2-hydroxyethyl)cyclopropanecarboxamide

N-(2-hydroxyethyl)cyclopropanecarboxamide was prepared by the reaction of cyclopropanecarboxylic acid chloride with 2-hydroxyethylamine. The purified product melts at 43–45° C.

Example 25.—N-allylcyclopropanecarboxamide

N-allylcyclopropanecarboxamide was prepared by reaction of cyclopropanecarboxylic acid chloride with allyl amine. The purified product melts at 35–36° C.

Example 26.—N-(2-pyridyl)cyclopropanecarboxamide

N-(2-pyridyl)cyclopropanecarboxamide was prepared by the reaction of cyclopropanecarboxylic acid chloride with 2-aminopyridine. The product melts at 24–25° C.

Example 27.—N,N-pentamethylenecyclopropanecarboxamide

N,N-pentamethylenecyclopropanecarboxamide was prepared by the reaction of cyclopropanecarboxylic acid chloride with piperidene. The product was distilled under reduced pressure and collected at 87–90° C./3 mm.

Example 28.—N-allylcyclopropanecarboxanilide

N-allylcyclopropanecarboxanilide was prepared by the reaction of cyclopropanecarboxylic acid chloride with N-allylaniline. The product was distilled under reduced pressure and collected at 120–123° C./5 mm.

Example 29.—N,N'-ethylenebiscyclopropane carboxamide

N,N' - ethylenebiscyclopropanecarboxamide was prepared by the reaction of two moles of cyclopropanecarboxylic acid chloride with one mole of ethylenediamine. The purified product melts at 227–228° C.

Example 30.—4-carbethoxycyclopropanecarboxanilide

4'-carbethoxycyclopropanecarboxanilide was prepared by the reaction of cyclopropanecarboxylic acid chloride with p-carbethoxyaniline. The purified product melts at 161–162.5° C.

*Example 31.—N-(4-cyclopropanecarbonyloxyphenyl) cyclopropanecarboxamide*

N - (4-cyclopropanecarbonyloxyphenyl)cyclopropanecarboxamide was prepared by the reaction of cyclopropanecarboxylic acid chloride with p-cyclopropanecarbonyloxyaniline. The purified product melts at 160–161.5° C.

*Example 32.—4'-fluorocyclopropanecarboxanilide*

4'-fluorocyclopropanecarboxanilide was prepared by the reaction of cyclopropanecarboxylic acid chloride with 4-fluoroaniline. The purified product melts at 160–162° C.

The following compounds were also prepared by the same general procedure in which cyclopropanecarboxylic acid chloride is reacted with the appropriate amine.

| Compound: | Melting point, ° C. |
|---|---|
| 2',4'-difluorocyclopropanecarboxanilide | 142–143.5 |
| 4'-hydroxycyclopropanecarboxanilide | 208–210 |
| 2',4',6'-trichlorocyclopropanecarboxanilide | 210–211 |
| 2',4',5'-trichlorocyclopropanecarboxanilide | 170–172 |
| 3'-iodocyclopropanecarboxanilide | 132–134 |
| 3',4'-dichloro-N-hydroxycyclopropanecarboxanilide | 130–132 |
| 3',4'-dimethylcyclopropanecarboxanilide | 137–139 |
| 2',5'-difluorocyclopropanecarboxanilide | 103–104 |
| 3',5'-dichlorocyclopropanecarboxanilide | 172–174 |

*Example 33.—3',4'-dichlorocyclopropanethiocarboxanilide*

3',4' - dichlorocyclopropanethiocarboxanilide was prepared by the following procedure. To a stirred solution of 16.1 grams (0.07 mole) 3',4-dichlorocyclopropanecarboxanilide and 108 ml. of xylene was added 9.9 grams (0.035 mole) of phosphorus pentasulfide at about 95–105° C. over a 15 minute period. The resulting mixture was stirred at 100° C. for 1 hour and then filtered while hot. The filtrate was kept cool for several days and then filtered again to remove a gummy residue. The resulting filtrate was diluted with about 500 ml. of n-hexane, and then chilled to about 0° C. to precipitate the crude product. The crude product, which was removed by a filtration, weighed 13.6 grams and melted at 93–100° C. Recrystallization from an ethanol-water mixture gave the purified product (6.1 g.) which melts at 108–109° C.

CONTROL OF PLANT GROWTH

As hereinbefore state, the cyclopropanecarboxamides of this invention exhibit excellent plant growth regulatory properties when applied to the locus of plants, such as the foliage of the growing plant or the plant growth medium, as for example soil in which the plant is growing or is to be grown.

The following examples show the activity of many of the compounds as post-emergence herbicides at a 5 pounds per acre rate of application.

*Example A*

A water suspension of the chemical was prepared by combining 0.4 gram of the chemical to be tested with 4 ml. of a solvent mixture (3 parts Emulphor EL–719 combined with one part xylene and one part kerosene) and then adding sufficient warm water to make 40 ml. of mixture. Emulphor EL–719 is described as a polyoxyethylated vegetable oil.

Oats, wheat, peas, radish, flax, millet, alfalfa, tomatoes and sugar beets were planted in 4″ pots in the greenhouse. Ten to eighteen days after the emergence of the plants, they were sprayed with the above prepared water emulsions at a rate of 5 lbs. of the active chemical per acre and a spray volume of 60 gallons per acre. Seven days after application, the plants were observed and the results of treatment recorded as in Table A.

The plants were rated as follows:
C=chlorosis
N=necrosis
G=growth inhibition
K=non-emergence
F=formative effect
0=No effect
1=Slight effect
2=Moderate effect
3=Severe effect
4=Maximum effect or dead plants

TABLE A

| Compound | Oats | Wheat | Peas | Radish | Flax | Millet | Alfalfa | Tomato | Sugar Beets |
|---|---|---|---|---|---|---|---|---|---|
| 3'-chlorocyclopropanecarboxanilide | G3 | G3 | G3 | 4 | 4 | 4 | 4 | 4 | 4 |
| 3',4'-dichlorocyclopropanecarboxanilide | 4 | 4 | 4 | 4 | 4 | 4 | 4 | 4 | 4 |
| 4'-chlorocyclopropanecarboxanilide | 3 | 4 | 4 | 4 | 4 | 4 | 4 | 4 | 4 |
| 2',4'-dichlorocyclopropanecarboxanilide | 0 | 0 | 0 | N2 | 0 | N2 | 0 | 0 | 0 |
| 2',5'-dichlorocyclopropanecarboxanilide | 0 | 0 | 0 | N2 | 0 | 0 | 0 | 0 | N3 |
| 2',3'-dichlorocyclopropanecarboxanilide | N1 | 0 | 0 | N1 | N1 | N3 | 0 | N1 | N1 |
| 3'-bromocyclopropanecarboxanilide | 0 | 0 | 4 | 4 | 4 | 4 | 4 | N3 | 4 |
| 4'-bromocyclopropanecarboxanilide | N1 | 0 | 0 | 4 | 4 | 4 | 4 | 0 | 4 |
| Cyclopropanecarboxanilide | G2 | G2 | 4 | N3 | 4 | 4 | 4 | 4 | 4 |
| N-methylcyclopropanecarboxanilide | 0 | 0 | N1 | N1 | 4 | 4 | 4 | 0 | 4 |
| 3'-trifluoromethylcyclopropanecarboxanilide | NIG1 | G2 | C2 | N2 | N2 | N3 | N3 | C1 | 4 |
| N-allylcyclopropanecarboxanilide | 0 | 0 | 0 | N1 | N1 | 0 | N1 | 0 | N1 |
| 3'-iodocyclopropanecarboxanilide | N2 | 0 | C1 | N3 | N3 | 4 | N3 | 0 | 4 |
| 3',4'-dichloro-N-hydroxycyclopropanecarboxanilide | 0 | 0 | 0 | 4 | 4 | 4 | N3 | N2 | 4 |
| 2',4',5'-trichlorocyclopropanecarboxanilide | 0 | 0 | 0 | N1 | 0 | N2 | 0 | 0 | 0 |
| 4'-cyclopropylcarbonyloxy-cyclopropanecarboxanilide | 0 | 0 | 0 | N1 | 0 | N1 | N1 | 0 | 0 |
| 4'-fluorocyclopropanecarboxanilide | N2 | G1 | C2 | N2 | 4 | 4 | 4 | N2C1 | 4 |
| 2',4'-difluorocyclopropanecarboxanilide | N1 | 0 | 0 | 0 | 0 | 0 | 0 | C1 | N2 |
| 3',5'-dichlorocyclopropanecarboxanilide | N2 | 0 | 0 | | N2 | 4 | 0 | 0 | N1 |
| 2',5'-difluorocyclopropanecarboxanilide | N1 | G1 | 4 | N3 | N3 | 4 | 4 | N2 | 4 |
| N-allylcyclopropanecarboxamide | 0 | G1 | 0 | N1 | 0 | 0 | 0 | 0 | 0 |
| 3'-4'-dichlorocyclopropylthiocarboxanilide | 0 | N2 | N3 | 4 | 4 | 4 | 4 | N3 | 4 |
| 4'-cyanocyclopropanecarboxanilide | N2 | 0 | 0 | N3 | N3 | N3 | N3 | N1 | 4 |
| 4'-nitrocyclopropanecarboxanilide | 0 | 0 | 0 | N2 | N1 | 0 | 0 | 0 | N1 |
| 3'-methoxycyclopropanecarboxanilide | N1 | 0 | 0 | N3 | N2 | N2 | 4 | N3 | 4 |
| N,N'-p-phenylenebiscyclopropanecarboxamide | 0 | 0 | 0 | 0 | 0 | 0 | N1 | 0 | N2 |
| N-(2,3,6-trichlorobenzyl)cyclopropanecarboxamide | 0 | 0 | 0 | N2 | 0 | N1 | N1 | 0 | N1 |
| Cyclopropanecarboxamide | 0 | 0 | 0 | N2 | 0 | N2 | N1 | 0 | 0 |
| N,N-di-n-butylcyclopropanecarboxamide | 0 | 0 | N1 | N1 | N2 | N1 | N1 | N1 | N2 |
| N-cyclohexylcyclopropanecarboxamide | N1 | 0 | N3 | N2 | N1 | N2 | 0 | 4 |
| N-(2-thiazolyl)cyclopropanecarboxamide | N1 | N1 | N2 | N2 | N3 | N2 | 0 | N2 | 4 |
| 3'-fluorocyclopropanecarboxanilide | NIG3 | NIG3 | N4 | N3 | N3 | 4 | 4 | 4 | 4 |
| 3'-chloro-4'-methylcyclopropanecarboxanilide | NIG2 | NIG2 | N3 | N3 | 4 | 4 | 4 | 4 | 4 |
| N-(4-chloro-2-butynyl)cyclopropanecarboxamide | N2 | N2 | N1 | N2 | N2 | N2 | 0 | N2 | N1 |

The following example illustrates the activity of many of the compounds of this invention as pre-emergence herbicides at a 20 pounds per acre rate of application.

*Example B*

An acetone solution of the chemical to be tested was prepared by dissolving 290 mg. of the chemical in 200 ml. of acetone.

Disposable paper half-flats were seeded and sprayed with the acetone solutions at a rate to give 20 lbs. of the active compound per acre. One flat, which had been seeded with alfalfa, brome, flax, oats, radishes and sugar beets, was held at 75° F. day temperature; another flat which had been seeded with corn, coxcomb, cotton, crabgrass, millet and soybeans was held at 85° F. Twenty-one days after seeding and treatment the flats were examined, plant emergence and chemical effects on the seedings were rated and recorded as in Table B. The rating system was the same as in Example A.

The presently preferred herbicidal compounds of this group are those having the formula:

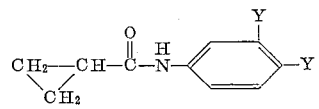

wherein Y represents a hydrogen, chloro, fluoro or methyl radical, at least one of said Y's being chloro or fluoro. Examples of new compounds represented by this formula are 3'-chlorocyclopropanecarboxanilide, 4'-chlorocyclopropanecarboxanilide, 3'-chloro-4'-methylcyclopropanecarboxanilide, 3'-fluorocyclopropanecarboxanilide, 4'-fluorocyclopropanecarboxanilide, 3'-fluoro-4'-methylcyclopropanecarboxanilide, and 3',4'-dichlorocyclopropanecarboxanilide. These novel compounds also exhibit fungicidal activity against fungi normally found in soil.

The presently preferred compound is 3',4'-dichlorocyclopropanecarboxanilide.

TABLE B

| Compound | Alfalfa | Brome | Flax | Oats | Radish | Sugar Beets | Corn | Coxcomb | Cotton | Crabgrass | Millet | Soybeans |
|---|---|---|---|---|---|---|---|---|---|---|---|---|
| N-(1-naphthyl)cyclopropanecarboxamide | G3N2 | K3 | 0 | 0 | 0 | 0 | G1 | N3 | K3 | 0 | K2 | N4 |
| 3'-chlorocyclopropanecarboxanilide | N4 | N4 | N4 | N4 | N4 | N4 | G2 | N4 | N4 | 0 | N4 | N4 |
| 3',4'-dichlorocyclopropanecarboxanilide | N4 | K2N2 | N4 | G2N2 | N4 | N4 | G2 | N4 | K4 | N3 | K4 | G3 |
| 4'-chlorocyclopropanecarboxanilide | N4 | N4 | N4 | N4 | N4 | N4 | N2 | N4 | N4 | N4 | N4 | G3 |
| 2'-chlorocyclopropanecarboxanilide | N4 | N4 | N4 | N4 | G3 | K4 | N4 | N4 | G2 | G2 | K4 | 0 |
| 2',4'-dichlorocyclopropanecarboxanilide | K2N2 | K2 | K3 | N2 | G1 | 0 | G1 | K4 | G3 | 0 | 0 | G3 |
| 2',5'-dichlorocyclopropanecarboxanilide | K3 | K3 | K2 | N1 | G1 | 0 | K2G2 | N4 | 0 | 0 | N2 | 0 |
| 2',3'-dichlorocyclopropanecarboxanilide | N3 | 0 | N4 | 0 | G1 | 0 | 0 | K4 | K3 | G2 | K4 | 0 |
| 3'-bromocyclopropanecarboxanilide | N4 | N4 | N4 | K3N2 | N4 | N4 | K2N2 | N4 | N2 | N4 | N4 | G3N2 |
| 4'-bromocyclopropanecarboxanilide | N4 | N3 | N4 | N3 | N4 | N4 | K2G2 | N4 | G1 | N4 | N4 | N4 |
| Cyclopropanecarboxanilide | N4 | K4 | N4 | K4 | G3 | K4 | K3G2 | K4 | N4 | N4 | N4 | G2 |
| N-methylcyclopropanecarboxanilide | N4 | G2 | N4 | K4 | N3 | N3 | G2 | K4 | N4 | G2 | N4 | N4 |
| 4'-cyanocyclopropanecarboxanilide | K4 | K3 | N4 | N3 | N4 | N4 | G2N2 | N4 | G2 | N4 | N4 | N2 |
| 4'-nitrocyclopropanecarboxanilide | N4 | N4 | N2 | N3 | N3 | N3 | K2G2 | N4 | N2 | N4 | N2 | N4 |
| 3'-methoxycyclopropanecarboxanilide | N4 | N3 | N4 | N3 | N4 | N3 | K4 | K4 | N2 | N2 | N4 | F3 |
| N,N'-p-phenylenebiscyclopropanecarboxamide | 0 | 0 | 0 | 0 | 0 | 0 | G1 | K3 | 0 | 0 | 0 | K2 |
| N-(2,3,6-trichlorobenzyl)cyclopropanecarboxamide | N3 | N2 | N1 | N2 | N3 | N2 | N1 | G3 | K2 | G1 | N4 | F1 |
| Cyclopropanecarboxamide | G1 | 0 | 0 | N1 | 0 | 0 | 0 | G1 | K4 | K4 | 0 | 0 |
| N-n-butylcyclopropanecarboxamide | N2 | K3 | N1 | G2N1 | G1 | 0 | 0 | G1 | G2 | K2G2 | K4 | G2N1 |
| N,N-di-n-butylcyclopropanecarboxamide | 0 | G1 | G2 | G2 | G1 | 0 | 0 | G1 | 0 | 0 | 0 | N1 |
| N-cyclopropylcyclopropanecarboxamide | 0 | N1 | N1 | N1 | N2 | 0 | 0 | 0 | K4 | N1 | 0 | N1 |
| N-cyclohexylcyclopropanecarboxamide | N4 | N3 | N4 | N3 | N4 | N3 | 0 | G2 | N4 | 0 | N2 | F3 |
| N-(2-thiazolyl)cyclopropanecarboxamide | N4 | N4 | N4 | N3 | N4 | G2N2 | N4 | N4 | N4 | N4 | N4 | N4 |
| 3'-fluorocyclopropanecarboxanilide | N4 | K4 | K4 | K4 | N3 | N4 | K2G2 | K4 | K4 | K2 | K3 | K4 |
| 3'-chloro-4'-methylcyclopropanecarboxanilide | N4 | 0 | N4 | N1 | N2 | K4 | G1 | K4 | K4 | G2 | K4 | 0 |
| N,N-(3-oxapentamethylene)cyclopropanecarboxamide | G1 | N1 | N2 | N2 | N1 | N1 | N1 | N1 | N2 | N1 | N1 | N1 |
| N-(2-purimidyl)cyclopropanecarboxamide | 0 | N1 | 0 | N1 | G1 | K3 | N1 | K4 | K4 | K4 | 0 | 0 |
| N-(4-chloro-2-butynyl)cyclopropanecarboxamide | 0 | K2 | K2 | G1 | G2 | K4 | 0 | K3 | K3 | G3 | G3 | K3 |
| N-trifluoromethylcyclopropanecarboxanilide | N4 | G1 | N4 | G3 | N4 | N4 | 0 | N4 | 0 | 0 | K3 | K4 |
| N-methylcyclopropanecarboxamide | N1 | N1 | N3 | N2 | N2 | N1 | 0 | N4 | N2 | N1 | N2 | N1 |
| N-(2-pyridyl)cyclopropanecarboxamide | N3 | K2 | 0 | 0 | 0 | 0 | N1 | G2 | N1 | K3 | N1 | N1 |
| N-allylcyclopropanecarboxanilide | N4 | G2 | N4 | N4 | N2 | N3 | G1 | N4 | 0 | G3 | N4 | N4 |
| 3'-iodocyclopropanecarboxanilide | N4 | N2 | K4 | G3N2 | N2 | N4 | G2 | K4 | 0 | G2 | K4 | G3 |
| 3',4'-dichloro-N-hydroxycyclopropanecarboxanilide | N4 | N4 | N4 | N3 | N4 | N4 | G2 | K4 | N2 | K4 | K4 | N2 |
| 2',4',5'-trichlorocyclopropanecarboxanilide | N3 | N1 | N2 | N1 | 0 | 0 | G1 | N4 | 0 | N4 | N2 | G1 |
| 2',4',6'-trichlorocyclopropanecarboxanilide | N1 | N1 | 0 | N1 | 0 | 0 | 0 | 0 | 0 | 0 | 0 | N1 |
| N-(2-hydroxyethyl)cyclopropanecarboxamide | 0 | 0 | 0 | 0 | 0 | 0 | 0 | K4 | K3 | 0 | 0 | 0 |
| 3',4'-dichlorocyclopropanethiocarboxanilide | N4 | N4 | N4 | N3 | N4 | N4 | 0 | N4 | N4 | N4 | N4 | G2N2 |

Some of the substituted cyclopropanecarboxanilides are especially useful as herbicides. Examples of compounds in this group are the cyclopropanecarboxanilides in which the phenyl radical has nuclear substituents such as chloro, fluoro, bromo, cyano, lower alkyl, and lower alkoxy. The thio analogues are also very active as herbicides.

*Example C*

3',4'-dichlorocyclopropanecarboxanilide was tested as a pre-emergence herbicide as in Example B except the application rates were lower. Table C gives the results when the compound was applied at rates of 10, 5 and 2.5 pounds per acre.

| Application Rate | Alfalfa | Brome | Flax | Oats | Radish | Soybeans |
|---|---|---|---|---|---|---|
| 10 | N4 | N2 | N4 | G2N2 | K4 | G2 |
| 5 | N4 | N2 | K3 | N1 | N4 | G1 |
| 2.5 | N4 | 0 | G2 | N1 | N2 | G1 |

| Application Rate | Sugar Beets | Corn | Coxcomb | Cotton | Crabgrass | Millet |
|---|---|---|---|---|---|---|
| 10 | K4 | G1 | K4 | N1 | G3 | N4 |
| 5 | K4 | G1 | K4 | N1 | G3 | N4 |
| 2.5 | K2 | G1 | K4 | 0 | G2 | N2 |

These data show that 3',4'-dichlorocyclopropanecarboxanilide is an excellent pre-emergence herbicide for some plants, such as alfalfa and coxcomb at application rates as low as 2.5 pounds per acre.

*Example D*

A factorial test was set up to study the effects of plant age (7, 11, 20 and 26 days after seeding), plant species (wheat, oats, flax, peas, sugar beets, alfalfa, millet and radish), and rates (1 lb. and 0.2 pound per acre) using 3',4'-dichlorocyclopropanecarboxanilide as a post-emergence herbicide. The compound was formulated by dissolving in 14 ml. of a solvent mixture (3 parts Emulphor EL–719, 1 part xylene and 1 part kerosene) and 2.4 ml. of Tergitol TMN (a product described as trimethyl nonyl polyethylene glycol ether). Water was then added to form an aqueous emulsion. The plants were sprayed at 7, 11, 20 or 26 days after seeding at a rate of 1 or 0.2 pound of active compound per acre. Plant emergence was 3 to 6 days after seeding. The plants were examined seven days after treatment and the results recorded as in Table D. The plants were rated on a 0–4 system with 0 representing no effect and 4 representing dead plants.

TABLE D.—SPRAY TIME—DAYS AFTER SEEDING

| Pounds per acre | 7 | | 11 | | 20 | | 26 | |
|---|---|---|---|---|---|---|---|---|
| | 1 | 0.2 | 1 | 0.2 | 1 | 0.2 | 1 | 0.2 |
| Wheat | 1 | 1 | 4 | 3 | 4 | 3 | 1 | 1 |
| Oats | 1 | 1 | 4 | 2 | 1 | 1 | 1 | 1 |
| Flax | 4 | 4 | 4 | 4 | 4 | 4 | 4 | 4 |
| Peas | 1 | 0 | 4 | 4 | 4 | 4 | 4 | 4 |
| Sugar Beets | 4 | 4 | 4 | 4 | 4 | 4 | 4 | 3 |
| Alfalfa | 4 | 4 | 4 | 4 | 4 | 4 | 4 | 1 |
| Millet | 4 | 4 | 4 | 3 | 4 | 4 | 4 | 2 |
| Radish | 4 | 4 | 4 | 4 | 4 | 4 | 4 | 3 |

Thus, it can be seen that plant age is a factor in the resistance of certain plants used in the test. Peas can be weeded just as they emerge from the ground. Wheat and oats are resistant to the compound when they are young and again when they are older. Older plants in general are somewhat more resistant than younger plants.

An application rate of from about 20 pounds to as little as about 0.01 pound of one or more of the active compounds per acre is used. When the compounds are used as pre-emergence herbicides, an application rate of about 0.5 to about 20 pounds per acre is used, with about 2 to about 10 pounds per acre being preferred. When they are used as post-emergence herbicides, an application rate of about 0.01 to 20 pounds of one or more active compounds per acre is used, with an application rate of about 0.1 to 3 pounds per acre being preferred. When using a water emulsion of the herbicide, a spray volume of about 1 to about 100 gallons of aqueous emulsion, and preferably about 5 to 40 gallons, per acre is used.

By proper formulation and use of low application rates, the compounds of this invention can be used as selective herbicides to kill certain species of weeds in the presence of other crops. In an experiment to determine the effect of 3',4'-dichlorocyclopropanecarboxanilide as a post-emergence herbicide on various species of plants, 34 genera and 84 species have been investigated. Of these, 57 species were killed at a 1 pound per acre rate and 26 species were killed at a 0.2 pound per acre rate. No plant was completely immune to the effects of the one pound per acre rate.

Resistant families appear to be certain species of Gramineae, Ranunculaceae, Leguminosae, Cistaceae, Umbelliferae, Compositae and Plantaginaceae. The Compositae and Umbelliferae are perhaps somewhat more resistant than most other families.

Plant families which appear to be very susceptible are Polygonaceae, Chenopodiaceae, Amarantaceae, Portulacaceae, Papaveraceae, Linaceae, Euphorbaceae, Balsaminaceae, Apocyanaceae, Polemoniecee, Verbenaceae and Cucurbitaceae. These include perennial weeds such as devil's shoestring, leafy spurge, dogbane and blue verbain.

It is indicated that a total kill of practically all plant life can be obtained at a rate of around 5 pounds of 3',4'-dichlorocyclopropanecarboxanilide per acre.

CONTROL OF WEEDS IN CORN (MAIZE)

Although a high level of herbacidal activity in a substance is always interesting, as a practical matter, specific selectivity is a more valuable property. This results from the fact that a weed control problem usually involves either control of several species of weeds in a single crop, or control of only one or two species of weeds in the presence of many desirable species.

An interesting characteristic of the compositions disclosed herein is relatively low pre-emergence toxicity and in some instances even lower post-emergence toxicity to the common commercial varieties of corn (maize). This characteristic, taken alone, is not particularly unique, since corn is a vigorous grassy plant which is able to withstand considerable injury and loss of leaves during early stages of growth. What is more to the point is to consider the ability of a herbicide to kill a noxious weed of a type which is a genuine problem in corn fields. Since 3',4'-dichlorocyclopropanecarboxanilide showed a high level of phytotoxicity toward crabgrass and giant foxtail in preliminary greenhouse tests, further tests were made to determine application rates necessary to control these plant pests.

It was found in further greenhouse tests that 90 percent control of crabgrass could be obtained at an application rate of 2 lb. per acre and 90 percent control of giant foxtail was obtained at only 1 lb. per acre. In comparative tests, corn withstood application rates of at least 4 lb. per acre when sprayed at eleven days after emergence from the soil.

Cyclopropanecarboxanilide and 3',4'-dichloroisobutyranilide, disclosed to be active herbicides in German Auslegeschrift 1,005,784, were also tested at the same time under identical conditions for purposes of comparison. Although each of these compounds has a chemical structure partially resembling the preferred compound, results were not comparable. Both of the prior art herbicides failed to control giant foxtail at application rates as high as 4 lb. per acre. One compound, 3',4'-dichlorophenyl-isobutyranilide, achieved control of crabgrass only at 4 lb. per acre, which was the highest rate of application.

The extraordinary effectiveness of 3',4'-dichlorocyclopropanecarboxanilide against giant foxtail is the primary characteristic which makes this compound a desirable herbicide for controlling weeds in corn. Following is a description of outdoor tests with this compound.

In general, greenhouse test techniques are designed to produce a maximum amount of significant information with the least expense. One of the features of such experiments is very economical and efficient use of samples of herbicides. However, when a herbicide is employed outdoors using practical farming techniques there are some compromises which are advisable, which result in an increased consumption of herbicide. In outdoor spray application, for example, the spray equipment must move rapidly through the field and a spray which might drift on the wind cannot be tolerated.

Another characteristic of green house experiments is that they are conducted under rather ideal, unvarying climatic conditions. Under actual farming conditions, extremes of rainfall, temperature, humidity and wind velocity often cause herbicides to give unexpected results, both with regard to selectivity and overall phytotoxicity. The next logical step subsequent to green house testing, therefore, is to test the more interesting compounds outdoors.

Outdoor test plots were prepared by planting in rows about one foot apart, corn, soybeans, wheat, cotton, flax, velvet leaf, giant foxtail, downy brome, pigweed and crabgrass. When the corn was from about 6 to 10 inches high, the test plots were sprayed with 3',4'-dichlorocyclopropanecarboxanilide at several different rates of application, ranging from ¼ lb. per acre to 4 lb. per acre. For purposes of comparison, cyclopropanecarboxanilide and 3',4'-dichloroisobutyranilide were also applied at corresponding rates. The test plots were observed one week after application of the herbicides, at which time they were evaluated and photographed to provide a permanent record.. The results are tabulated below:

The ratings are the degree of injury to the plants on a scale of 0 to 10.

of the weeds, aimed forward and inclined downward at an angle of 15 degrees from horizontal. One nozzle sprayed on each side of a corn row, directly across from each other, the spray of the two nozzles being directed so as to cover a band fourteen inches wide, with the corn row in the center of the band. The nozzles used produced a flat, fan-shaped spray having a spray angle of 50° and delivering 0.05 gallon of liquid per minute through each nozzle at a pressure of 20 p.s.i.g. Spraying was conducted when both the corn and weeds were at various stages of growth, so as to determine the optimum conditions for weed control. In general, good control was obtained at an application rate of less than about 3 pounds per acre when the weeds were less than about 12 inches and the corn less than about 20 inches in height. Although corn as high as 3 feet was sprayed, only in one isolated experiment was there any significant injury to corn. It is conceivable that this occurrence was at least partially attributable to some sort of error. Damage of corn foliage at a late stage of growth is known to be injurious, however, and should be avoided. For example, in studies of hail damage it has been demonstrated that at the 11 to 12-leaf stage, 10 to 25 percent defoliation of corn results in a 5 to 10 percent loss of yield at time of harvest.

The most economical and effective control of weeds was obtained under the following conditions:

Height of corn _____ About 8 to 13 inches.
Height of weeds ____ About 3 to 6 inches.
Rate of application __ About 1.5 lbs. per acre (in the area sprayed, or approximately 0.5 lb. per acre of corn).

Somewhat different conditions may prove to be most effective and economical if a different type of spray equipment is used. For instance, when the spray nozzles were inclined more than about 15 degrees downward from the horizontal, control of weeds at a particular application rate was observed to be poorer. A reasonable explanation of this effect is that more spray went on the ground and less on the weeds. With reasonably well arranged spray nozzles, an application rate of from about 1 to

|  | Cyclopropanecarboxanilide, Application Rate (lb./A.) | | | | | 3',4'-Dichlorocyclopropanecarboxanilide, Application Rate (lb./A.) | | | | | 3',4'-Dichloroisobutyranilide, Application Rate (lb./A.) | | | | |
|---|---|---|---|---|---|---|---|---|---|---|---|---|---|---|---|
|  | ¼ | ½ | 1 | 2 | 4 | ¼ | ½ | 1 | 2 | 4 | ¼ | ½ | 1 | 2 | 4 |
| Corn | 0 | 0 | 0 | 4 | 7 | 0 | 0 | 1 | 6 | 7 | 0 | 0 | 0 | 5 | 6 |
| Soybeans | 0 | 0 | 3 | 7 | 9 | 1 | 1 | 7 | 8 | 9 | 0 | 1 | 5 | 6 | 8 |
| Wheat | 0 | 0 | 1 | 2 | 6 | 0 | 0 | 3 | 4 | 6 | 0 | 0 | 1 | 1 | 5 |
| Cotton | 1 | 0 | 3 | 7 | 9 | 1 | 4 | 9 | 9 | 9 | 1 | 2 | 5 | 8 | 9 |
| Flax | 0 | 1 | 2 | 7 | 9 | 2 | 4 | 9 | 9 | 9 | 0 | 1 | 4 | 5 | 9 |
| Velvet leaf | 0 | 1 | 4 | 5 | 8 | 5 | 7 | 9 | 9 | 9 | 1 | 2 | 3 | 6 | 8 |
| Giant Foxtail | 0 | 1 | 2 | 4 | 6 | 1 | 3 | 9 | 9 | 9 | 0 | 1 | 3 | 5 | 7 |
| Downy Brome | 0 | 1 | 4 | 6 | 7 | 2 | 7 | 5 | 6 | 9 | 0 | 2 | 3 | 7 | 7 |
| Pigweed | 0 | 2 | 5 | 7 | 9 | 7 | 9 | 9 | 9 | 9 | 0 | 4 | 6 | 7 | 9 |
| Crabgrass | 0 | 0 | 4 | 6 | 8 | 2 | 3 | 7 | 9 | 9 | 0 | 1 | 3 | 5 | 8 |

It can be seen from the above data that good control of giant foxtail was obtained with only slight injury to corn at only 1 lb. per acre with 3',4'-dichlorocyclopropanecarboxanilide, whereas the prior art compositions failed to control giant foxtail effectively at any rate of application without substantial injury to corn.

The preferred compound, 3',4'-dichlorocyclopropanecarboxanilide, was tested in practical trials in weedy sections of cornfields in a number of different localities.

Experimental plots consisting of single rows of corn 50 feet in length were set aside in several different locations in which weeds had emerged in sufficient density that it was apparent that corn yields would be adversely affected.

All of the experimental plots were treated with a spraying apparatus equipped with spring-loaded skids which rode on the surface of the ground. Spray nozzles were attached to the skids at a level approximating the height about 2 pounds of 3',4'-dichlorocyclopropanecarboxanilide per acre of sprayed area will provided the most economically effective control of the weeds which are sprayed. By simultaneous mechanical cultivation of a central strip between the corn rows, the consumption of herbicide per acre of corn is reduced by more than one-half, making for the most economical control of weeds, and avoiding injury to either the foliage or root system of the corn.

FORMULATION OF HERBICIDES

The excellent herbicidal activity of the cyclopropanecarboxamides of this invention requires the application of only small amounts of the active ingredient distributed uniformly over a wide area. Of course, this is difficult to do employing the pure material. However, by increasing the bulk of the material, such as by mixing the compound with an inert diluent or carrier, the application to growing plants and soil can be achieved more readily. Such carriers may be either solids, such as talc, clay, diatomaceous earth, sawdust, calcium carbonate or the like, or liquids such as water, kerosene, acetone, benzene, toluene, xylene, and the like, in which the active compound may be dissolved or dispersed.

Emulsifying agents preferably are used to achieve a suitable emulsion or dispersion in liquids such as water to give aqueous sprays. Emulsifying agents and wetting agents may also be used to aid in dispersing the active compound in carrier liquids in which the compound is not completely soluble and to increase coverage by the active compound. Emulsifying agents and wetting agents, also known as "surface active agents," are sold under numerous trade marks and may be either pure compounds, mixtures of compounds of the same general group, or they may be mixtures of compounds of different classes.

There are thus also provided by this invention novel herbicidal compositions containing one or more of the described cyclopropanecarboxamides intimately dispersed with or dissolved in a surface active agent. Typical satisfactory surface active agents which may be used are the alkali metal higher alkylarylsulfonates such as sodium dodecylbenzenesulfonate and the sodium salts of alkylnaphthalenesulfonic acids, fatty alcohol sulfates such as the sodium salts of the monoesters of sulfuric acid with n-aliphatic alcohols containing about eight to eighteen carbon atoms, long chain quaternary ammonium compounds, sodium salts of petroleum-derived alkylsulfonic acids, polyethylene sorbitan monooleate, alkylarylpolyether alcohols, water-soluble lignin sulfonate salts, alkalicasein compositions, long chain alcohols usually containing about ten to eighteen carbon atoms, and condensation products of ethylene oxide with fatty acids, alkylphenols or mercaptans.

Other additives such as a lanolin or kerosene emulsion, or Tween-20 (a product described as sorbitan monolaurate polyoxyalkylene derivative), stickers and other auxiliary materials may be included in solid or liquid formulations to increase coverage of the active compound. These materials are also considered to be surface active agents.

A specific example of an emulsifiable concentrate which may be used in controlling weeds in corn has the following composition on a weight basis:

| | Percent |
|---|---|
| 3',4'-dichlorocyclopropanecarboxanilide | 24.4 |
| Isophorone | 35.6 |
| Mesityl oxide | 32.0 |
| Emcol Ad–506 (a mixture of nonionic and anionic surface active agents) | 8.0 |

It will be understood that proportions of ingredients may be varied from those given and that other ingredients may be added to the formulation. The mixture of isophorone and mesityl oxide is a very useful and efficient solvent for 3',4'-dichlorocyclopropanecarboxanilide. Although other solvents may be used, many common organic solvents fail to dissolve large enough proportions of the herbicide to form a marketable concentrate.

Alternatively, a wettable powder consisting of about 50 percent of finely divided active ingredients and about 50 percent finely divided calcium lignosulfonate inert ingredient may be dispersed readily in water containing a surface active agent. The wettable powder may be shipped and stored more cheaply and conveniently than the emulsifiable concentrate. However, the liquid concentrate can be mixed with water by use of equipment consisting essentially of only an inexpensive low-pressure pump and a metering valve. Depending on the type of equipment available, there are therefore valid reasons for preferring either the liquid or dry type of formulation.

Various changes and modifications of the invention can be made and to the extent that such variations incorporate the spirit of this invention they are intended to be included within the scope of the appended claims.

What is claimed is:

1. The method of controlling plant growth which comprises applying to the locus of the plant a herbicidal amount of a compound selected from the group:

3',4'-dichlorocyclopropanecarboxanilide
4'-cyanocyclopropanecarboxanilide
3'-methoxycyclopropanecarboxanilide
N-(2-thiazolyl)cyclopropanecarboxamide
3',4'-dichlorocyclopropanethiocarboxanilide
3',4'-dichloro-N-hydroxycyclopropanecarboxanilide
N-(4-chloro-2-butynyl)cyclopropanecarboxamide 2. The method of controlling weeds in corn which comprises applying to the foliage of said weeds a herbicidal amount of 3',4'-dichlorocyclopropanecarboxanilide.

3. The method of controlling weeds in corn which comprises applying to weeds which are less than about 12 inches high and are growing in close proximity to corn, which is les than about 20 inches high, a herbicidally effective amount of 3',4'-dichlorocyclopropanecarboxanilide, not exceeding about 3 pounds per acre of area to which the composition is applied.

4. The method of controlling weeds in corn which comprises applying to weeds which are about 3 to 6 inches in height and which are growing in close proximity to corn which is about 8 to 13 inches in height an aqueous spray composition containing 3',4'-dichlorocyclopropanecarboxanilide at a rate of application between about 1 and 2 pounds of 3',4'-dichlorocyclopropanecarboxamide per acre of sprayed area.

5. A herbicidal composition comprising about 50 percent finely divided solid 3',4'-dichlorocyclopropanecarboxanilide and about fifty percent finely divided calcium lignosulfonate.

6. An emulsifiable herbicidal composition comprising 3',4'-dichlorocyclopropanecarboxanilide and a mixture of nonionic and anionic surface active agents dissolved in a mixture of isophorone and mesityl oxide.

References Cited by the Examiner

UNITED STATES PATENTS

| 2,337,846 | 12/1943 | Coleman et al. | 260—561 |
| 2,784,226 | 3/1957 | Brown | 260—563 |
| 3,149,155 | 9/1964 | Seefelder | 260—557 |
| 3,201,466 | 8/1965 | Dubrouin | 71—2.6 X |
| 3,246,975 | 4/1966 | Hopkins et al. | 71—2.5 X |

OTHER REFERENCES

Fischer et al., German application 1,005,784, printed April 1957 (Kl 451.5).

ELBERT L. ROBERTS, *Acting Primary Examiner.*

JAMES O. THOMAS, JR., *Examiner.*